United States Patent
Gonschorek (10) Patent No.: US 12,503,158 B2
(45) Date of Patent: Dec. 23, 2025

(54) COOPERATIVE VEHICLE LATERAL GUIDANCE CLOSED-LOOP CONTROL, COMPUTER PROGRAM PRODUCT AND OPEN-LOOP CONTROL DEVICE FOR A MOTOR VEHICLE

(71) Applicant: ZF AUTOMOTIVE GERMANY GMBH, Alfdorf (DE)

(72) Inventor: Robert Gonschorek, Düsseldorf (DE)

(73) Assignee: ZF AUTOMOTIVE GERMANY GMBH, Alfdorf (DE)

(*) Notice: Subject to any disclaimer, the term of this patent is extended or adjusted under 35 U.S.C. 154(b) by 58 days.

(21) Appl. No.: 18/754,262

(22) Filed: Jun. 26, 2024

(65) Prior Publication Data

US 2025/0002080 A1  Jan. 2, 2025

(30) Foreign Application Priority Data

Jun. 27, 2023  (DE) ...................... 10 2023 206 057.4

(51) Int. Cl.
*B62D 6/04* (2006.01)
(52) U.S. Cl.
CPC ...................... *B62D 6/04* (2013.01)
(58) Field of Classification Search
CPC ...................................... B62D 6/00
See application file for complete search history.

(56) References Cited

U.S. PATENT DOCUMENTS 4,828,061 A * 5/1989 Kimbrough ............ B62D 7/159
180/413
4,842,089 A * 6/1989 Kimbrough ............ B62D 7/159
180/413

(Continued)

FOREIGN PATENT DOCUMENTS

DE 102014220865 B4 7/2019
DE 102021205253 A1 11/2022

OTHER PUBLICATIONS

Search report for corresponding application No. 102023206057.4, dated Jan. 31, 2024, 8 pages.

*Primary Examiner* — Long T Tran
(74) *Attorney, Agent, or Firm* — Tarolli, Sundheim, Covell & Tummino LLP (57) ABSTRACT

The present invention generally relates to closed-loop control methods, a computer program product and an open-loop control device (28) for a motor vehicle (24). The closed-loop control method is configured for the cooperative vehicle lateral guidance of a motor vehicle (24) with respect to a reference trajectory by means of an overall closed control loop (12) of a vehicle closed-loop control unit (26). The overall closed control loop (12) comprises at least one first closed-loop control module (18) and one second closed-loop control module (20). The first closed-loop control module (18) has a dynamic open-loop pilot controller (14) having a virtual closed control loop (22) which is configured to take into account a steering wheel state based on a manual steering input for influencing the vehicle lateral guidance. The second closed-loop control module (20) has a non-linear adaptive model-predictive closed-loop controller which is configured to compensate for at least one unknown estimated disturbance state based on at least one disturbance variable which causes a deviation of the vehicle lateral guidance from the reference trajectory.

14 Claims, 5 Drawing Sheets

(56) References Cited

U.S. PATENT DOCUMENTS

| | | | | |
|---|---|---|---|---|
| 12,202,354 B1* | 1/2025 | Chen | ............... | G06N 7/02 |
| 2002/0198646 A1* | 12/2002 | Bedner | ............ | B60T 8/1764 |
| | | | | 180/197 |
| 2008/0065292 A1* | 3/2008 | Katrak | ............ | B62D 6/002 |
| | | | | 701/41 |
| 2019/0202498 A1* | 7/2019 | Karve | ............ | B62D 5/0463 |
| 2023/0234640 A1* | 7/2023 | Strecker | ............ | B62D 6/008 |
| 2024/0359735 A1* | 10/2024 | Thelen | ............ | B62D 6/002 |

* cited by examiner

COOPERATIVE VEHICLE LATERAL GUIDANCE CLOSED-LOOP CONTROL, COMPUTER PROGRAM PRODUCT AND OPEN-LOOP CONTROL DEVICE FOR A MOTOR VEHICLE

RELATED APPLICATIONS

This application claims priority from DE Patent Application 10 2023 206 057.4 filed 27 Jun. 2023, the entirety of which is hereby incorporated herein by reference.

TECHNICAL FIELD

The present invention generally relates to closed-loop control methods, a computer program product and an open-loop control device for a motor vehicle.

BACKGROUND

Modern steering systems, such as steer-by-wire steering systems, have closed-loop control mechanisms in order to enable an automated steering intervention by a driving assistance system, for example for automated lane changes by a lane change assistant. The automated steering intervention is performed in relation to a reference trajectory.

In previous closed-loop control methods, a driver intervention for influencing the steering movement is interpreted, on the basis of a manual steering input by modifying the steering angle, as a disturbance intervention in the underlying closed-loop control method with regard to the deviation from the reference trajectory. As a result, previous closed-loop control methods compensate for manual steering interventions. This restricts the functionality of such steering systems, especially with regard to manual steering interventions during the performance of automated steering movements.

There is therefore a need to be able to control a steering system in a closed-loop manner in such a way that cooperative lateral guidance of the vehicle is enabled, i.e. a real coexistence between the steering control by a vehicle closed-loop control unit and the driver.

SUMMARY

The object is achieved by the subjects of the independent patent claims. Advantageous embodiments are specified in the dependent patent claims and the following description, each of which may represent aspects of the disclosure on their own or in (sub) combination. Some aspects are explained with regard to different variants. However, the features should be transferred to one another.

According to one aspect, the present invention relates to a closed-loop control method. The closed-loop control method is configured for the cooperative vehicle lateral guidance of a motor vehicle with respect to a reference trajectory by means of an overall closed control loop of a vehicle closed-loop control unit. The overall closed control loop has at least one first closed-loop control module and one second closed-loop control module.

The first closed-loop control module has a dynamic open-loop pilot controller having a virtual closed control loop. The open-loop pilot controller is configured to take into account a steering wheel state based on a manual steering input for influencing the vehicle lateral guidance. In particular, the virtual closed control loop is designed for a desired disturbance transmission behaviour in relation to manual steering inputs for influencing the vehicle lateral guidance.

The second closed-loop control module has a non-linear adaptive model-predictive closed-loop controller (MPC). The MPC is configured to compensate for at least one unknown estimated disturbance state based on at least one disturbance variable that causes a deviation of the vehicle lateral guidance from the reference trajectory.

By virtue of the first closed-loop control module, which has a specially configured dynamic open-loop pilot controller, manual steering inputs can be specifically taken into account. This means that they are no longer interpreted as (unknown) disturbance states or disturbance interventions in an automated steering process. This makes it possible to prevent manual steering inputs from being compensated for, even though the driver makes a manual steering intervention for the intended deviation from that trajectory which is caused by the automated steering process (without the manual steering input). This enables true cooperative vehicle lateral guidance in which steering interventions are equally possible by a driving assistance system and a driver. The closed-loop control method therefore guarantees an increased functionality of the underlying steering system compared to previously known methods and systems.

In particular, the closed-loop control method also enables gentle manual steering interventions with a low intensity, since the cooperative vehicle lateral guidance enables seamless transitions between the automated vehicle lateral guidance and the manual steering intervention. The closed-loop control method does not require any specialized mixing processes ("blending") between the steering modifications (automated/manual). The closed-loop control method also does not require any adjustment of gain factors ("gain scheduling"), which would also prevent seamless closed-loop control. In addition, no saturation of the closed-loop controller output of the underlying closed-loop control unit is required either, which also prevents seamless transitions.

In the present case, a virtual closed control loop should be understood as meaning a closed control loop implemented in software.

Optionally, the virtual closed control loop is configured for a specific disturbance behaviour of the vehicle lateral guidance in relation to the steering inputs by the driver. In other words, the virtual closed control loop is specifically configured to modify the effects of a manual steering input by the driver in relation to previous closed-loop control methods. The modification is carried out in such a way that seamless, cooperative vehicle lateral guidance is enabled.

Preferably, the virtual closed control loop can be configured for a predefined range of values of manual steering inputs by the driver.

Alternatively or cumulatively, the virtual closed control loop is matched to the topology of the remaining overall closed control loop, in particular in order to enable manual steering inputs by the driver with regard to the closed-loop control in such a way that these are not compensated for.

The non-linear adaptive MPC provides a closed-loop control mechanism that automatically adapts to changes in the route dynamics that are dependent on the vehicle speed. The closed and open control loop thus has the same dynamics regardless of the vehicle speed. Unlike a multiplicity of existing approaches, gain scheduling is not required here. The adaptability simplifies the evaluation of the performance and the stability analysis of the closed-loop control system. In some embodiments, the non-linear adaptive MPC has a disturbance variable observer which reconstructs unknown disturbance variables and compensates for them by means of feed-forward control. The unknown disturbance variables may include, for example, at least one of a road camber, a side wind, a road inclination, a road bend, a weight distribution of the motor vehicle and/or a model error. As a result, the lateral guidance of the vehicle can be fundamentally matched to the vehicle with regard to various external influences in order to compensate for such influences. This means that the lateral guidance of the vehicle is less prone to disturbance.

Preferably, the disturbance variable may also comprise a plurality of components that are based on the influences mentioned.

The at least one disturbance variable can be detected by means of at least one sensor of the vehicle. Of course, a plurality of identical and/or different sensors can also be used to detect the respective disturbance variable. The detected disturbance variable is then made available to the vehicle closed-loop control unit.

Optionally, the steering wheel state is determined by a steering wheel angle and/or a steering wheel torque. The steering wheel angle applied by the driver to the steering wheel forms the input variable of the virtual closed control loop. The steering wheel angle can be determined in relation to a reference position of the steering wheel. The steering wheel torque can be used as a measure of the deflection speed of the steering wheel. In other words, the steering wheel torque describes the intensity of the manual steering input.

A sensor of the vehicle can be used to detect the steering wheel state. In particular, the sensor can be assigned to the steering wheel of the vehicle.

In some embodiments, the virtual closed control loop is calculated on a server which communicates with the vehicle closed-loop control unit. For example, modern communication protocols such as 5G or 6G can be used for this purpose. This means that the vehicle closed-loop control unit may have an internal communication device or may be coupled to an external communication device in such a way that it can communicate with a server. As a result, the software underlying the first closed-loop control module does not need to be present in every vehicle closed-loop control unit. This simplifies modification of the underlying software of the virtual closed control loop, for example with regard to an update. In addition, the requirements for the hardware of the vehicle closed-loop control unit are reduced, since computing-intensive processes are outsourced to an external server.

Preferably, the virtual closed control loop determines a manipulated variable that is made available to the second closed-loop control module as an input variable. This simplifies the consideration of the manual steering input within the second closed-loop control module by the first closed-loop control module based on the virtual closed control loop. In this respect, the specific manipulated variable can be configured to prevent the manual steering input from being interpreted and compensated for as a disturbance variable.

In addition, the virtual closed control loop preferably determines a virtual system state that is made available to the second closed-loop control module as an input variable. As a result, the virtual system state dependent on the manual steering input can be additionally specifically taken into account. In this way, the cooperation of the closed-loop control system is achieved. In some embodiments, the second closed-loop control module comprises a state estimation module which is configured to determine an estimated system state of the system, from which the virtual system state is subtracted. The estimated system state of the system denotes the state of the system, including the manual steering input.

This allows the estimated system state determined by the state estimation module to be correlated with the virtual system state determined by the virtual closed control loop. As a result, the effect of the manual steering input can be hidden from the non-linear adaptive MPC closed-loop controller of the second closed-loop control module.

The steering wheel state, an unknown estimated disturbance state and a deviation state, which describes a deviation of a vehicle centre of gravity from the reference trajectory, are optionally input variables of the state estimation module. This means that all relevant parameters describing the state of the vehicle with regard to the reference trajectory and the internal and external influences are known. This can increase the precision with which the system state is determined.

A reinitialization interface for the state estimation module and the virtual closed control loop is preferred. The reinitialization interface enables an offset correction of the lateral deviation state in the event of a lane change. Thus, in the cooperative driving mode, a seamless transition is achieved when changing lanes. Furthermore, the same reinitialization interface can be used for the functional integration of the closed-loop control with a trajectory planner.

Preferably, the reference trajectory may be determined by a road marking or a sequence of road markings. As road markings are very common, this allows corresponding reference trajectories to be ensured practically with respect to each road.

Optionally, the virtual closed control loop includes a state closed-loop controller. This makes it possible to stabilize the closed-loop controlled system for the vehicle lateral guidance. For example, the state closed-loop controller may be designed on the basis of the eigenvalue specification. The position of the double integrator eigenvalues of the closed-loop controlled system can then be specifically influenced.

Optionally, the closed-loop control method is in the form of a computer-implemented method. This means that the essential closed-loop control mechanisms can be carried out with the aid of one or more data processing devices.

According to a further aspect, the present invention also relates to a computer program product comprising instructions which, when the program is executed by a computer, cause the computer to carry out the closed-loop control method as described herein. The advantages achieved by the closed-loop control method described herein are also achieved in a corresponding manner by the computer program product.

According to an additional aspect, the present invention also relates to a computer-readable storage medium comprising instructions which, when the program is executed by a computer, cause the computer to carry out the closed-loop control method as described herein. The advantages achieved by the closed-loop control method described herein are also achieved in a corresponding manner by the computer-readable storage medium.

According to a further aspect, the present invention also relates to an open-loop control device for a motor vehicle. The open-loop control device is configured to carry out a closed-loop control method as described herein. In particular, the open-loop control device may comprise the vehicle closed-loop control unit. The advantages achieved by the closed-loop control method described herein are also achieved in a corresponding manner by the open-loop control device.

Preferably, the open-loop control device can be specifically configured for the vehicle lateral guidance.

In one alternative, the open-loop control device can also be part of a higher-level vehicle open-loop control device.

According to a further aspect, the present invention also relates to an assembly comprising an electronic steering system and an open-loop control device associated with the steering system for a motor vehicle as described above. The open-loop control device is configured to carry out a closed-loop control method as described herein. The advantages achieved by the closed-loop control method described herein are also achieved in a corresponding manner by the assembly.

The steering system can be configured as a so-called EPS steering system (Electric Power Steering system) or a steer-by-wire steering system.

According to yet another aspect, the present invention also relates to a motor vehicle having an open-loop control device as described above. The advantages achieved by the closed-loop control method described herein are also achieved in a corresponding manner by the motor vehicle.

Preferably, the motor vehicle comprises an electronic steering system, for example a so-called EPS steering system (Electric Power Steering system) or a steer-by-wire steering system.

Optionally, the motor vehicle may comprise in particular a road vehicle. As an alternative, the vehicle may also comprise other vehicle types, for example aircraft, ships, two-wheeled vehicles, motorcycles or the like. Overall, a vehicle is understood here to mean a device that is configured to transport objects, cargo or people between different destinations. Examples of vehicles are land vehicles such as motor vehicles, electric vehicles, hybrid vehicles or the like, rail vehicles, aircraft or watercraft. Preferably, vehicles in this context may be considered to be road-bound vehicles, such as for example cars, lorries, buses or the like.

All of the features explained with regard to the various aspects may be combined on their own or in (sub) combination with other aspects.

BRIEF DESCRIPTION OF THE DRAWINGS

The disclosure, along with further advantageous embodiments and developments thereof, will be described and explained in more detail below with reference to the examples illustrated in the drawings, in which.

DESCRIPTION

All the features disclosed below with reference to the exemplary embodiment and/or the accompanying figure may be combined on their own or in any subcombination with features of the aspects of the present disclosure, including features of preferred embodiments, provided that the resulting combination of features makes sense to a person skilled in the art in the technical field.

Figure 1:
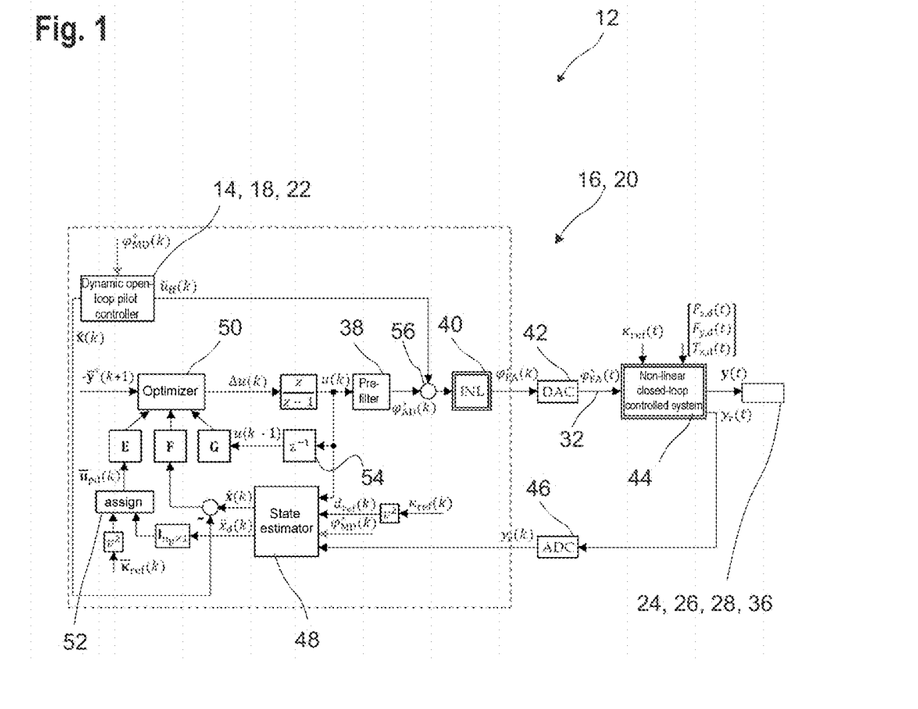
FIG. 1 shows a simplified schematic representation of an overview of the overall closed control loop, underlying the cooperative vehicle lateral guidance, for the closed-loop control method according to one embodiment of the present invention.

FIG. 1 shows a simplified schematic representation of an overview of the overall closed control loop 12, underlying the cooperative vehicle lateral guidance, for the closed-loop control method according to one embodiment of the present invention.

The overall closed control loop 12 comprises a first closed-loop control module 18 and a second closed-loop control module 20.

The first closed-loop control module 18 has a dynamic open-loop pilot controller 14 having a virtual closed control loop 22.

The second closed-loop control module 20 has a non-linear adaptive model-predictive closed-loop controller (MPC, feedback closed-loop controller 16).

As an input signal, the dynamic open-loop pilot controller 14 receives the manual steering input made by a driver of the motor vehicle 24, referred to as: $\varphi^*_{MD}(k)$. According to previous closed-loop control concepts, this manual steering input $\varphi^*_{MD}(k)$ is interpreted as an external disturbance and is compensated for overall, especially for steering inputs that have small amplitudes. This is why a seamless transition between automatic vehicle lateral guidance and manual lateral guidance has been prevented so far, especially for steering inputs with small amplitudes.

Figure 2:
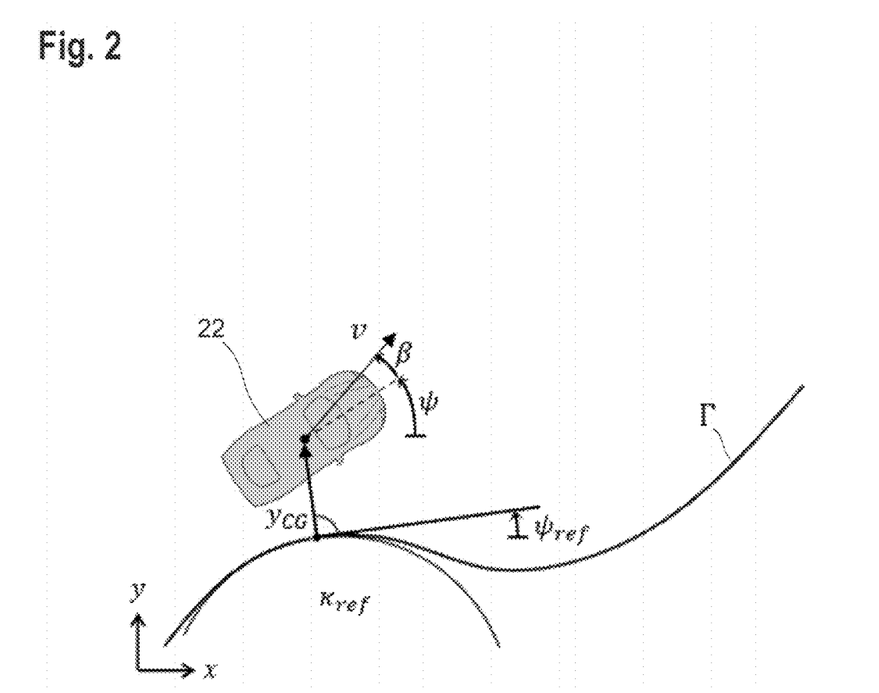
FIG. 2 shows a simplified schematic representation of a deviation of a motor vehicle from a reference trajectory.

The overall closed control loop 12 is configured to carry out a closed-loop control method for the closed-loop control of a lateral deviation of the motor vehicle 24 from a reference trajectory Γ, taking into account a manual steering input $\varphi^*_{MD}(k)$ by the driver. In this context, FIG. 2 shows a simplified schematic representation of a deviation of a motor vehicle 24 from the reference trajectory Γ.

An explanation is given below, by way of example for a steering angle-controlled front axle actuator, of a non-linear mathematical model on which the overall closed control loop 12 is based.

The main dynamics of steering angle closed-loop control of the front axle actuator are determined by a dominant pair of poles. The transmission behaviour may therefore be approximated by a second-order delay element with Butterworth attenuation D and natural angular frequency $\omega_0$:

$$\begin{bmatrix} \dot{\varphi}_{PN} \\ \dot{\Omega}_{PN} \end{bmatrix} = \begin{bmatrix} 0 & 1 \\ -\omega_o^2 & -2D\omega_o \end{bmatrix} \begin{bmatrix} \varphi_{PN} \\ \Omega_{PN} \end{bmatrix} + \begin{bmatrix} 0 \\ \omega_o^2 \end{bmatrix} [\varphi_{FA}] \qquad (1)$$

$$[\varphi_{PN}] = \begin{bmatrix} 1 & 0 \end{bmatrix} \begin{bmatrix} \varphi_{PN} \\ \Omega_{PN} \end{bmatrix}$$

Here, $\varphi_{PN}$ is the steering angle and $\Omega_{PN}$ is the steering angle speed, i.e. the steering angle and the steering angle speed, which a steering actuator of the underlying steering system gives to the motor vehicle 24 for vehicle lateral guidance. $\varphi_{FA}$ is a reference steering angle, i.e. the final manipulated variable of the overall closed control loop 12, in order to adapt the actual trajectory of the motor vehicle 24 to the reference trajectory Γ.

A non-linear, dynamic, single-track model of the motor vehicle 24 is used to describe the lateral movement of the motor vehicle 24. This model may be derived from the equilibrium of forces and torque equilibrium at the centre of mass of the motor vehicle 24, with a constant speed v=konst. of the motor vehicle 24 being assumed.

The following non-linear differential equations are obtained with the steering angle $\varphi_{PN}$, as well as external time-dependent lateral forces $F_{y,d}(t)$ (in a corresponding manner for $F_{x,d}(t)$, depending on the position of the coordinate system) and torques $T_{z,d}(t)$ as disturbance variables (e.g. caused by a side wind):

$$\dot{\beta} = \frac{1}{mv}[F_f \cos(i_s \varphi_{PN} - \beta) + F_r \cos(\beta) + F_{y,d}\cos(\beta)] - \dot{\psi} \quad (2)$$

$$\ddot{\psi} = \frac{1}{J_z}[F_f l_f \cos(i_s \varphi_{PN}) - F_r l_r + T_{z,d}].$$

Here, $\beta$ is a camber angle of the motor vehicle 24, $l_f$ is a distance of the front axle from the centre of mass of the motor vehicle 24, $l_r$ is a distance of the rear axle from the centre of mass of the motor vehicle 24, $i_s$ is a steering ratio, $F_f$ is a lateral force of the front axle, $F_r$ is a lateral force of the rear axle and m is the mass of the motor vehicle 24.

The transverse rigidities may be adapted to the current driving situation. Any suitable mathematical tyre model may be used here, for example the Pacejka model:

$$F_f = D_f \sin[C_f \arctan(B_f \tan(\alpha_f) - E_f(B_f \tan(\alpha_f) - \arctan(B_f \tan(\alpha_f))))]$$

$$F_r = D_r \sin[C_r \arctan(B_r \tan(\alpha_r) - E_r(B_r \tan(\alpha_r) - \arctan(B_r \tan(\alpha_r))))]$$

$$\alpha_f = i_s \varphi_{PN} - \beta - \frac{l_f \dot{\psi}}{v}$$

$$\alpha_r = -\beta + \frac{l_r \dot{\psi}}{v}.$$

To describe the movement of the motor vehicle 24, the model equations (2) are extended by error equations. The error equations comprise a lateral position error $y_{CG}$ and a yaw angle error $\Delta\psi = \psi - \psi_{ref}$ with respect to the point on the reference trajectory $\Gamma$ at the shortest distance from the motor vehicle 24, see FIG. 2.

It is assumed here that the reference trajectory $\Gamma$ may be approximated locally by circular segments of curvature $k_{ref} = 1/R_{ref}$, wherein $R_{ref}$ is the radius of the respective circular segment.

Assuming small yaw angle errors, this gives $$\dot{y}_{CG} = v \sin(\Delta\psi + \beta) \approx v(\Delta\psi + \beta) \quad (3)$$

$$\Delta\dot{\psi} = \dot{\psi} - v\kappa_{ref}.$$

Combining equations (1), (2) and (3) gives the non-linear closed-loop controlled system model 44 of the lateral dynamics of the motor vehicle 24, see FIG. 1.

The overall closed control loop 12 is at least partially implemented in a vehicle closed-loop control unit 26 of the motor vehicle 24. The vehicle closed-loop control unit 26 can be part of an open-loop control device 28.

In general, the vehicle closed-loop control unit 26 is configured to control at least one lateral movement of the motor vehicle 24 at least partially automatically, in particular fully automatically.

Figure 3:
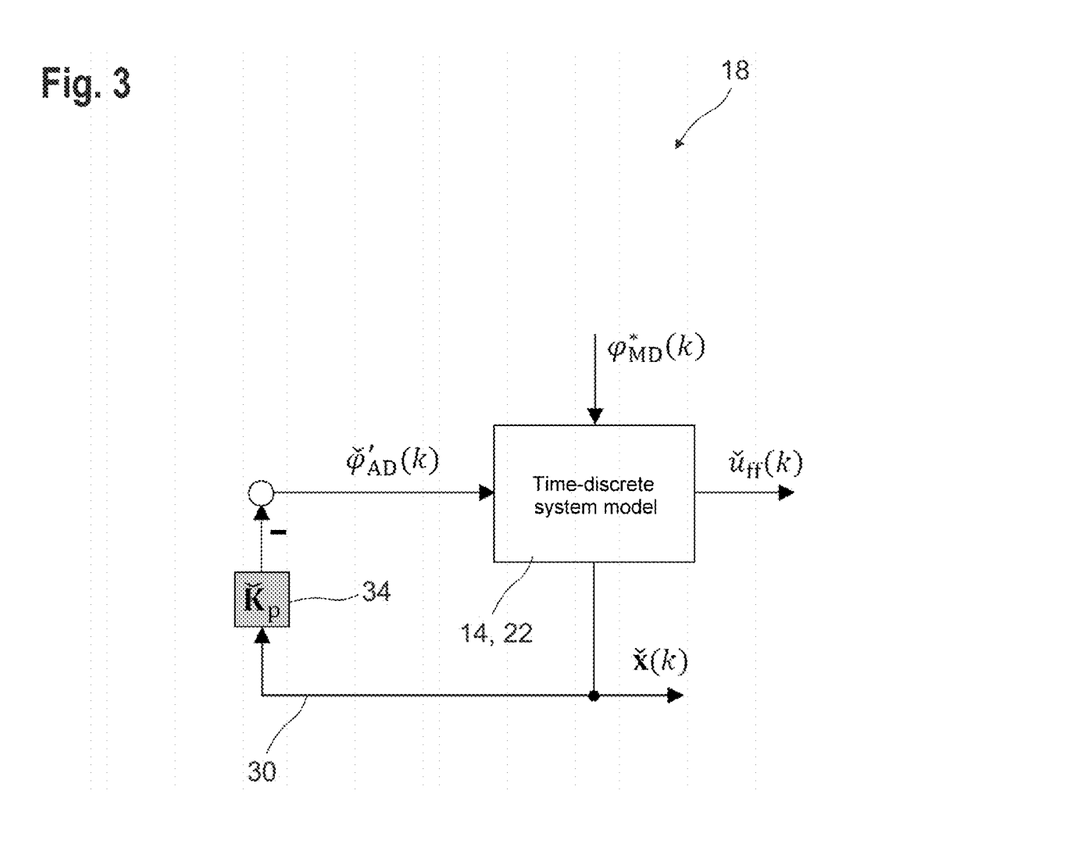
FIG. 3 shows a simplified schematic representation of the first closed-loop control module of the overall closed control loop for the closed-loop control method according to one embodiment of the present invention.

The first closed-loop control module 18 has a resulting closed-loop controlled system 30, which is illustrated in FIG. 3 which shows a simplified schematic representation of the first closed-loop control module 18 of the overall closed control loop 12 for the closed-loop control method according to one embodiment of the present invention.

The second closed-loop control module 20 comprises a second closed-loop controlled system 32.

The first closed-loop controlled system 30 comprises a feedback closed-loop controller 34 with state feedback. This stabilizes the virtual closed control loop 22 with regard to the closed-loop control behaviour. In the present case, the feedback closed-loop controller 34 is formed on the basis of the eigenvalue specification. This is due to the fact that the virtual closed control loop 22, in the view of the time-discrete residual system model, represents a 5th order system, the eigenvalues of which are given by the pre-filter 38, the steer-by-wire front axle actuator steering closed-loop control and the error equations relative to the reference trajectory $\Gamma$. Since the error equations introduce a double integrator eigenvalue at $z^2=1$, the resulting system model is unstable and cannot be used for dynamic open-loop pilot control. Therefore, stabilization by feedback within the virtual closed control loop 22 is required, which is why this comprises the feedback closed-loop controller 34. Therefore, the closed-loop controller with full feedback (feedback closed-loop controller 34) is synthesized on the basis of the eigenvalue assignment. The positions of the initial eigenvalues are retained and only the integrator eigenvalues are assigned at suitable locations.

The second closed-loop controlled system 32 comprises the motor vehicle 24, and in particular the (electro-) mechanical components of an underlying steering system 36 thereof, for example steering actuators.

Here and in the following, it is assumed, without limiting generality, that the motor vehicle 24 has a steer-by-wire steering system 36. This means that there is no mechanical operative connection between the steering wheel and the rack.

The virtual closed control loop 22 determines a manipulated variable, referred to as: $\breve{u}_{ff}(k)$. In addition, the virtual closed control loop 22 determines a virtual system state $\breve{x}(k)$ that takes into account the effect of the manual steering input $\varphi^*_{MD}(k)$ on the system states.

According to the present embodiment, the manipulated variable $\breve{u}_{ff}(k)$ and the virtual system state $\breve{x}(k)$ are determined online by the virtual closed control loop 22. For this purpose, the vehicle closed-loop control unit 26 is coupled to a server.

The manipulated variable $\breve{u}_{ff}(k)$ determined by the virtual closed control loop 22 of the first closed-loop control module 18 and the determined virtual system state $\breve{x}(k)$ are made available to the second closed-loop control module 20 as input variables.

By supplying the manipulated variable $\breve{u}_{ff}(k)$ determined by the first closed-loop control module 18 to the real system as part of the second closed-loop control module 20, the manual steering input $\varphi^*_{MD}(k)$ is propagated within the second closed-loop controlled system 32 of the second closed-loop control module 20.

By supplying the manipulated variable $\breve{u}_{ff}(k)$ determined by the first closed-loop control module 18 to the real system as part of the second closed-loop control module 20, the disturbance behaviour of the virtual closed control loop 22 in relation to driver steering inputs is transferred to the real system.

The second closed-loop control module 20 further comprises a pre-filter 38, an inversion unit 40 ("Inverse Non-linearity Control", INL), a digital-to-analogue converter 42 (DAC), the non-linear closed-loop controlled system model 44, an analogue-to-digital converter 46 (ADC), a state estimator 48 (state estimation module) and an optimization unit 50 within the second closed-loop controlled system 32.

The state estimator 48 determines an estimated system state x̃(k) based on various input variables. The manipulated variable u(k) determined by the second closed-loop control module 20, the manual steering input φ*$_{MD}$(k), optionally an unknown known disturbance variable d*$_{ref}$(k) and the measured lateral deviation y$_r$(k) are used as input variables of the state estimator 48.

The time-continuous measurement variable y$_r$(t) is recorded in the time period, for example by a sensor, and is then converted into a time-discrete measurement variable y$_r$(k) using the ADC 46.

The additional open-loop control input of the state estimator 48, at which the manual steering input φ$_{MD}$(k) is provided, prevents the manual steering input φ$_{MD}$(k) from being part of the disturbance variable estimate by the state estimator 48. The integral closed-loop controller effect of the overall closed control loop 12 therefore allows the driver to intervene. This allows the driver to override the active closed-loop control and seamlessly change the lateral vehicle trajectory.

The known disturbance variable k$_{ref}$(k) corresponds to the curvature of the reference trajectory Γ. The virtual disturbance variable d$_{ref}$(k) corresponds to the curvature of the reference trajectory Γ, which is then multiplied only by the square of the speed v of the motor vehicle 24:

$$d_{ref}(k) = k_{ref}(k)v^2.$$

The disturbance k$_{ref}$(k) is provided by a trajectory planning system over the prediction horizon n$_p$. Thus, the progression of the future disturbance variables can $$\overline{k}_{ref}(k) = [\kappa_{ref}(k) \; \kappa_{ref}(k+1) \; \ldots \; \kappa_{ref}(k+n_p-1)]$$

be taken into account in the form of a preview in the MPC closed-loop controller.

The unknown estimated disturbance variable x̂$_d$(k) (e.g. side wind, sloping road, model error) is assumed to be constant over the prediction horizon. It is thus multiplied by the unit vector I$_{n_p \times 1}$ of appropriate length and combined with the disturbance variable d̄$_{ref}$(k)=k̄$_{ref}$(k)v² measured in the future in a combination unit 52, thereby giving a disturbance sequence ū$_{pd}$(k).

The disturbance sequence ū$_{pd}$(k) is multiplied by a first system matrix E and supplied to the optimization unit 50.

The virtual system state x̌(k) determined by the first closed-loop control module 18 is subtracted from the estimated system state x̃(k):

$$\dot{x}(k) = \tilde{x}(k) - \check{x}(k).$$

Thus, within the second closed-loop controlled system 32 of the second closed-loop control module 20, the effect of the manual steering input φ*$_{MD}$(k) can be compensated for when determining the estimated system state x̃(k). In other words, by subtracting the virtual system state x̌(k) from the estimated system state x̃(k), the effect of the driver intervention is hidden from the non-linear adaptive MPC closed-loop controller 16 of the second closed-loop control module 20.

The system state x̌(k) that results after subtraction is multiplied by a second system matrix F and is likewise supplied to the optimization unit 50.

A provisional manipulated variable u(k−1) determined in the last iteration is provided via a delay element 54, multiplied by a third system matrix G and supplied to the optimization unit 50.

The optimization unit 50 determines an optimal provisional manipulated variable u(k) by solving a quadratic optimization problem under constraints.

To this end, the following cost function J is defined:

$$J = \sum_{i=1}^{n_p} \|Q^*[y(k+i)]\|^2 + r^* \sum_{i=0}^{n_c-1} \|[\Delta u(k+i)]\|^2.$$

Here, Q* and r* are weighting matrices that "penalize" lateral position errors, lateral error speeds and changes in the provisional manipulated variable, that is to say increase the value of the cost function J.

The cost function J is minimized in terms of Δu under the following constraints:

$$u_{min} \leq u(k+i) \leq u_{max}, \; i = 0, \ldots, n_c - 1.$$

Here, Δū$^T$=[Δu(k), ..., Δu(k+n$_c$−1)]. The constraints replicate for example the mechanical limits of the steering angle, that is to say a maximum rotation of the wheels of the motor vehicle 24.

In order to compensate for differences in the sample times between the detection of a deviation of the actual trajectory from the reference trajectory Γ (typically T$_S$≈0.05 s) and the steering angle closed-loop control (typically T$_S$≈0.001 s), the pre-filter 38 is provided between the first closed-loop control module 18 and the second closed-loop control module 20.

The pre-filter 38 is designed for example as a low-pass filter with a cut-off frequency ω$_F$.

The manipulated variable ǔ$_{ff}$(k) determined by the first closed-loop control module 18 is combined in a combination unit 56 with the optimal provisional manipulated variable u(k) determined by the optimization unit 50. As a result, the optimal provisional steering angle φ*$_{AD}$(k) is determined by the combination unit 56.

The optimal provisional steering angle φ*$_{AD}$(k) is then supplied to the inversion unit 40. The inversion unit 40 is configured to invert the speed dependence of the second closed-loop controlled system 32 by means of a virtual closed control loop and feedback linearization in real time in order to compensate for the speed dependence of the second closed-loop controlled system 32. This results in φ*$_{FA}$(k).

The inversion unit 40 is designed on the basis of the speed-dependent part. The time-dependent optimal steering angle φ*$_{FA}$(t) is thus obtained using the subsequent DAC 42.

The time-dependent optimal steering angle φ*$_{FA}$(t) is made available to the non-linear system model 44 which also incorporates the time-dependent known measurement disturbance variable k$_{ref}$(t). Furthermore, the external time-dependent lateral forces F$_{y,d}$(t) (in a corresponding manner for F$_{x,d}$(t), depending on the position of the coordinate system) and torques T$_{z,d}$(t) are taken into account as disturbance variables in the non-linear system model 44.

Figure 4:
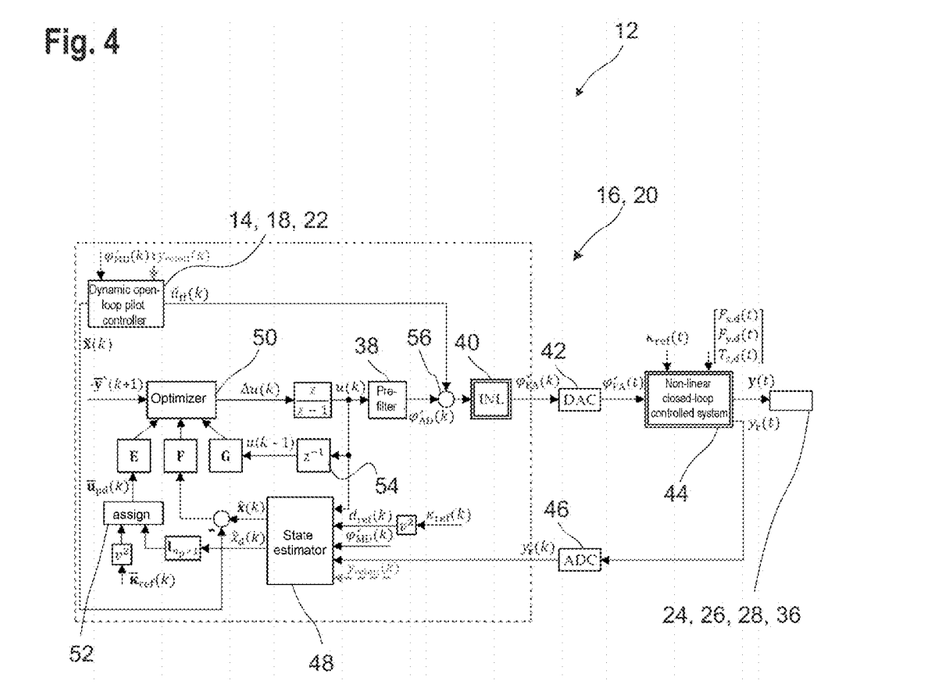
FIG. 4 shows a further simplified schematic representation of an overview of the overall closed control loop, underlying the cooperative vehicle lateral guidance, for the closed-loop control method, taking into account a reinitialization interface according to one embodiment of the present invention.

FIG. 4 shows a further simplified schematic representation of an overview of the overall closed control loop 12, underlying the cooperative vehicle lateral guidance, for the closed-loop control method, taking into account a reinitialization interface $y_{reinit}(k)$ according to one embodiment of the present invention. Only the differences to the preceding embodiment of the overall closed control loop 12 are explained here.

The reinitialization interface $y_{reinit}(k)$ enters the dynamic open-loop pilot controller 14 of the first closed-loop control module 18 and the state estimator 48 of the second closed-loop control module 20 as an input variable. It enables an offset correction of the lateral deviation state in the event of a lane change. Thus, in the cooperative driving mode, a seamless transition is achieved when changing lanes.

The other state variables of the overall closed control loop 12 develop continuously over time and thus remain unchanged. Since the resulting system model is implemented in a variable state form within the dynamic cooperative open-loop pilot controller of the first closed-loop control module 18 and the extended optimal state estimator 48, the corresponding states are directly accessible for reinitialization. The same reinitialization interfaces can also be used for the functional integration with an external trajectory planner.

Figure 5:
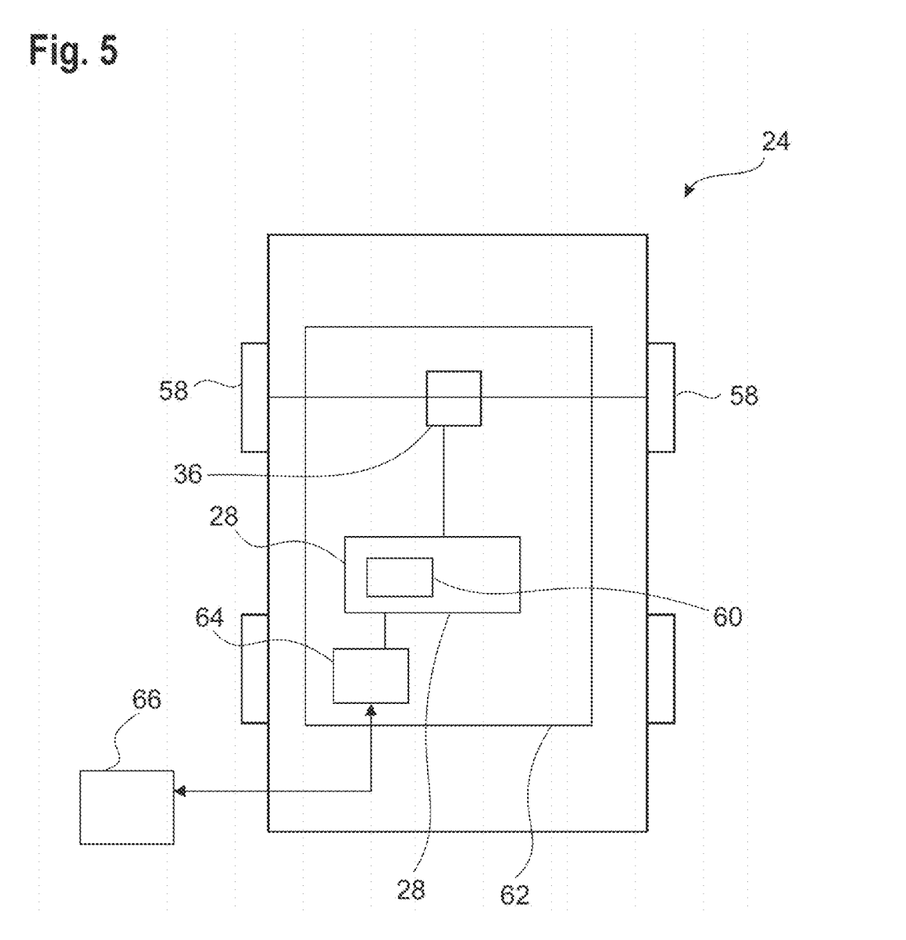
FIG. 5 shows a simplified schematic representation of a motor vehicle having an open-loop control device according to one embodiment of the present invention.

FIG. 5 shows a simplified schematic representation of a motor vehicle 24 having an open-loop control device 28 according to one embodiment of the present invention.

The motor vehicle 24 has front wheels 58 which are coupled to an electronic steering system 36 for vehicle lateral guidance. The electronic steering system 36 is coupled to the open-loop control device 28. The open-loop control device 28 has at least one data processing device 60 which is configured to execute the overall closed control loop 12. The open-loop control device 28 and the electronic steering system 36 are part of an assembly 62.

The assembly 62 further comprises a communication device 64 which is coupled to the open-loop control device 28 or, alternatively, may be a part thereof.

The open-loop control device 28 can communicate with a server 66 by means of the communication device 64. Parts of the overall closed control loop 12 can then be determined online, for example the virtual closed control loop 22.

The invention claimed is:

1. Closed-loop control method for the cooperative vehicle lateral guidance of a motor vehicle (24) with respect to a reference trajectory by means of an overall closed control loop (12) of a vehicle closed-loop control unit (26), wherein the overall closed control loop (12) has at least one first closed-loop control module (18) and one second closed-loop control module (20),
   wherein the first closed-loop control module (18) has a dynamic open-loop pilot controller (14) having a virtual closed control loop (22) which is configured to take into account a steering wheel state based on a manual steering input for influencing the vehicle lateral guidance, and
   wherein the second closed-loop control module (20) has a non-linear adaptive model-predictive closed-loop controller which is configured to compensate for at least one unknown estimated disturbance state based on at least one disturbance variable which causes a deviation of the vehicle lateral guidance from the reference trajectory.

2. Closed-loop control method according to claim 1, wherein the at least one disturbance variable is a road camber, a side wind, a road inclination, a road bend, a weight distribution of the motor vehicle and/or a model error.

3. Closed-loop control method according to claim 1, wherein the steering wheel state is determined by a steering wheel angle, and wherein the steering wheel state is an input variable of the virtual closed control loop (22).

4. Closed-loop control method according to claim 1, wherein the virtual closed control loop (22) is calculated on a server (66) which communicates with the vehicle closed-loop control unit (26).

5. Closed-loop control method according to claim 1, wherein the virtual closed control loop (22) determines a manipulated variable which is made available to the second closed-loop control module (20) as an input variable.

6. Closed-loop control method according to claim 1, wherein the virtual closed control loop (22) determines a virtual system state which is made available to the second closed-loop control module (20) as an input variable.

7. Closed-loop control method according to claim 6, wherein the second closed-loop control module (20) comprises a state estimation module (48) which is configured to determine an estimated system state of the system, from which the virtual system state is subtracted.

8. Closed-loop control method according to claim 7, wherein the steering wheel state, the unknown estimated disturbance state and a deviation state, which describes a deviation of a vehicle centre of gravity from the reference trajectory, are input variables of the state estimation module (48).

9. Closed-loop control method according to claim 7, wherein a reinitialization interface is an input variable of the state estimation module (48) and the virtual closed control loop (22), wherein the reinitialization interface ensures an offset correction of a lateral deviation state for a lane change.

10. Closed-loop control method according to claim 1, wherein the virtual closed control loop (22) comprises a feedback closed-loop controller (34).

11. Closed-loop control method according to claim 1, wherein the unknown estimated disturbance state is assumed to be constant over a prediction horizon.

12. Closed-loop control method according to claim 1, wherein the closed-loop control method is in the form of a computer-implemented method.

13. Computer program product comprising instructions which, when the program is executed by a computer, cause the computer to carry out the method according to claim 1.

14. Open-loop control device (28) for a motor vehicle (24), wherein the open-loop control device (28) is configured to carry out a closed-loop control method according to claim 1.

* * * * *